(12) United States Patent
Schreiner et al.

(10) Patent No.: US 8,006,472 B1
(45) Date of Patent: Aug. 30, 2011

(54) COTTON PICKER UNIT DRIVE WITH CONTROLLABLE SPINDLE SPEED TO DRUM SPEED RATIO AND BELT DRIVE

(75) Inventors: Joel M. Schreiner, Ankeny, IA (US); Kevin J. Goering, Cambridge, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 12/910,246

(22) Filed: Oct. 22, 2010

(51) Int. Cl.
*A01D 46/14* (2006.01)
(52) U.S. Cl. .......................................................... 56/49
(58) Field of Classification Search ............... 56/48, 49, 56/28, 47, 43, 41, 36, 10.2 H, 10.2 R, 10.1; 701/50
See application file for complete search history.

(56) References Cited

U.S. PATENT DOCUMENTS

| | | | |
|---|---|---|---|
| 3,035,387 A | 5/1962 | Bevill | |
| 3,116,584 A * | 1/1964 | Hubbard | 56/44 |
| 3,439,788 A | 4/1969 | Fergason | |
| 3,999,359 A | 12/1976 | Jordan et al. | |
| 4,866,918 A | 9/1989 | Engelstad et al. | |
| 4,896,491 A | 1/1990 | Warnsholz et al. | |
| 5,038,552 A * | 8/1991 | Thedford et al. | 56/44 |
| 5,099,635 A * | 3/1992 | Butkovich et al. | 56/13.5 |
| 5,247,786 A | 9/1993 | Schreiner | |
| 5,325,656 A | 7/1994 | Schreiner et al. | |
| 6,059,656 A | 5/2000 | Satzler | |
| 6,212,864 B1 | 4/2001 | Harden et al. | |
| 7,299,611 B2 * | 11/2007 | Orsborn et al. | 56/28 |
| 7,386,380 B2 | 6/2008 | Bares et al. | |
| RE40,611 E * | 12/2008 | O'Halloran et al. | 56/6 |
| 7,614,208 B2 * | 11/2009 | Johannsen et al. | 56/47 |
| 2008/0046154 A1 * | 2/2008 | Bares et al. | 701/50 |

* cited by examiner

*Primary Examiner* — Árpád Fábián-Kovács

(57) ABSTRACT

A cotton harvester row unit includes belt drive and a variable transmission to reduce noise and optimize spindle and doffer speeds of rotation while permitting spindle drum structure rotational speed to change with changes in harvester speed. In one embodiment, a variable speed motor drives the ring gear of a planetary gear set to vary the ratio of spindle and doffer speed to drum speed. The planetary gear set may be enclosed to also help reduce noise and to decrease grease consumption. Nearly constant spindle and doffer speeds may be maintained over a wide range drum rotational speeds, and the upper speeds may be limited to avoid operation above critical speeds of components. The transmission may be configured to reduce or completely eliminates gear meshing off of the drum centerline to thereby reduce row unit manufacture precision, and a relatively low power motor may be used to adjust the ratio of spindle and doffer speed to drum speed.

20 Claims, 3 Drawing Sheets

COTTON PICKER UNIT DRIVE WITH CONTROLLABLE SPINDLE SPEED TO DRUM SPEED RATIO AND BELT DRIVE

FIELD OF THE INVENTION

The present invention relates generally to spindle type cotton harvesters and, more specifically, to the row unit drive for such harvesters.

BACKGROUND

Mechanical cotton pickers with spindle type picking units include drives synchronizing drum speed to ground speed. In the past, spindle and doffer speeds have been a direct ratio of the drum speed. To improve productivity the ground speed and therefore the drum speed have been increased. However, the maximum spindle and doffer speeds have remained generally constant. As a result the ratio of doffer and spindle speed to drum speed has to be reduced as well so that the maximum speeds are not exceeded when the harvester is operating at high ground speeds. The spindles therefore make fewer revolutions while engaging the row at any given speed and the doffers rotate more slowly. The reduced speed ratio of the spindles and doffers to the drum speed negatively impacts picking efficiency and conveying capacity, particularly in tough or high yielding cotton conditions.

Commonly assigned U.S. Pat. No. 5,325,656 illustrates several solutions for addressing the problems associated with spindle and doffer speeds. Solutions include an independent spindle drive system, a manual shift transmission to select different drive ratios, and an automatic transmission to provide two or more drive ratios. Although the independent drive and transmission systems help overcome the speed ratio problem, such systems can be costly. In addition, drive systems typically include multiple gear drives that can be very noisy and require a constant supply of grease. The row unit cabinet is manufactured with precision to assure proper gear meshing between the axes of the driven components.

SUMMARY

A cotton harvester row unit drive for a row unit is provided having spindle drum structure with rotatable spindles and rotatable doffing structure supported in a row unit housing for movement at a variable forward speed over a field of cotton. The drive includes a drum drive rotating the drum structure about a drum axis at a speed generally proportional to the forward speed, a spindle drive and a variable ratio transmission structure connecting the drum drive to the spindle drive. A controller varies the ratio of drum structure rotational speed to spindle rotational speed. At least one of the drum drive and the spindle drive includes a continuous flexible drive belt.

A belt drive may be used to power front and rear spindles, as well as the front and rear doffers. Power to the drums may be transmitted through a planetary gear set mounted on the axis of a first drum. By locking a ring gear on the planetary gear set, the row unit operates in a conventional fashion with the spindle and doffer speeds being directly proportional to the drum speed which, in turn, is synchronized to ground speed. A variable speed ring gear drive, such as an electric or hydraulic motor, allows the ratio of the spindle and doffer speeds to the drum speed to be adjusted to maintain picking and doffing efficiency over a wide range of operating speeds and prevents spindle and doffer overspeeding when the harvester is operated at high speeds. Other types of controllable drives may also be used.

A belt drive may be used to drive the front and rear doffers, and the same belt drive or a second belt drive may also power the spindle drums for reduced noise and reduced drive complexity. In one possible embodiment, a variable speed motor connected to a speed controller drives a ring gear on the planetary gear set to maintain an optimal spindle and doffer speed as the drum speed varies with changing harvester ground speed. A relatively low power motor, smaller and less expensive than would be required to provide direct independent drive of the spindles and doffers, may be used to control the ring gear. The drive may be converted between a fixed and a variable ratio system by adding or removing the ring gear so that many identical components may be used for both a high feature version of a row unit and a low cost version fixed ratio version. The planetary ratio is variable over a range that accommodates use with different sized picker drums, including 12- and 16-bar drums, so that component commonality and manufacturability is increased and costs are lowered. In a possible embodiment, a belt drive may be connected between a controlled speed planetary on one drum and second transmission or drive on a second drum.

The belt drive provides quiet operation and does not require grease. The belt drive and planetary reduce or completely eliminate gear meshes between parallel centerlines to thereby reduce the precision required in the row unit cabinet to further improve manufacturability and reduce costs. The planetary gear set may be enclosed to further reduce noise and to decrease grease consumption.

DETAILED DESCRIPTION

Figure 1:
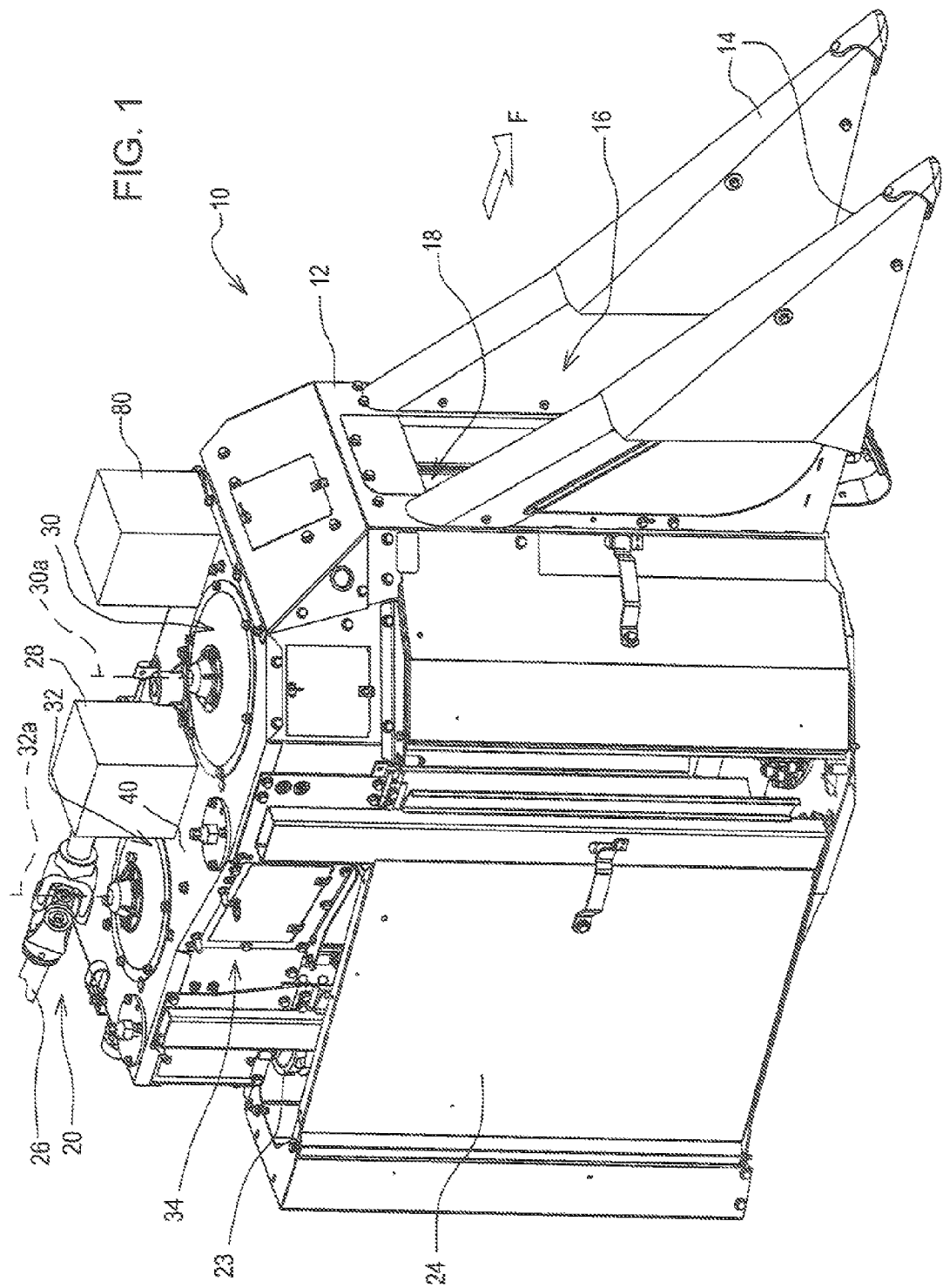
FIG. 1 is a front perspective view of a cotton harvester row unit.

Referring to FIG. 1, therein is shown a cotton harvester row unit 10 having a row unit housing 12 and stalk lifters 14 is supported for forward movement F over the ground for receiving a row of cotton plants in a row receiving area 16. Cotton picking and doffing structure 18 supported in the housing 12 is powered by drive structure 20. Rotating spindles 22 (FIG. 3) remove cotton from the plants entering the row receiving area 16. The removed cotton is unwrapped from the spindles 22 by doffers 23 and is conveyed rearwardly within door structure 24 towards a cotton receiver (not shown). The row unit 10, with the exception of the drive structure 20 which is described in detail below, may be of conventional construction, such as the type shown and described in the aforementioned U.S. Pat. No. 5,325,656. Other row unit configurations may also be used, and the present structure is given for an example only to help describe embodiments of the drive structure 20.

As shown in FIG. 1, a main drive shaft 26 typically is driven at a controlled speed so that the picking structure enters the row move at a speed proportional to the forward speed of the row unit 10. The drive shaft 26 is connected to a right angle drive 28 located between front and rear spindle drum assemblies 30 and 32. The spindle drum assemblies include picker bars rotatable about upright axes 30*a* and 32*a* via drive 28 at speeds generally synchronized with the forward speed so that the velocity of the spindles relative to the row approaches zero. Although a particular central location is shown, the drive 28 may be located at other positions on the row unit 10.

Figure 2:
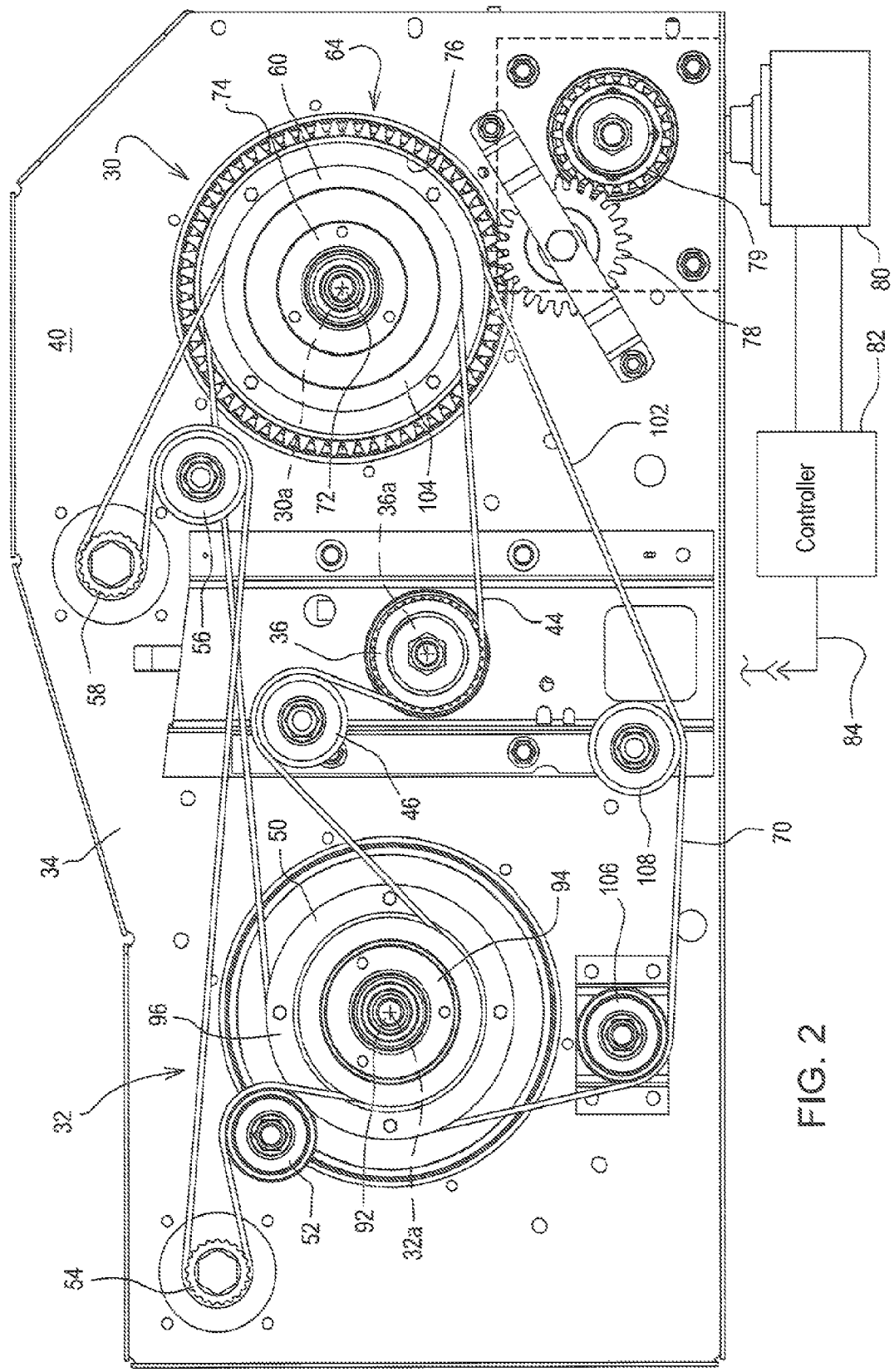
FIG. 2 is a bottom view of belt drive structure for the row unit of FIG. 1.
Figure 3:
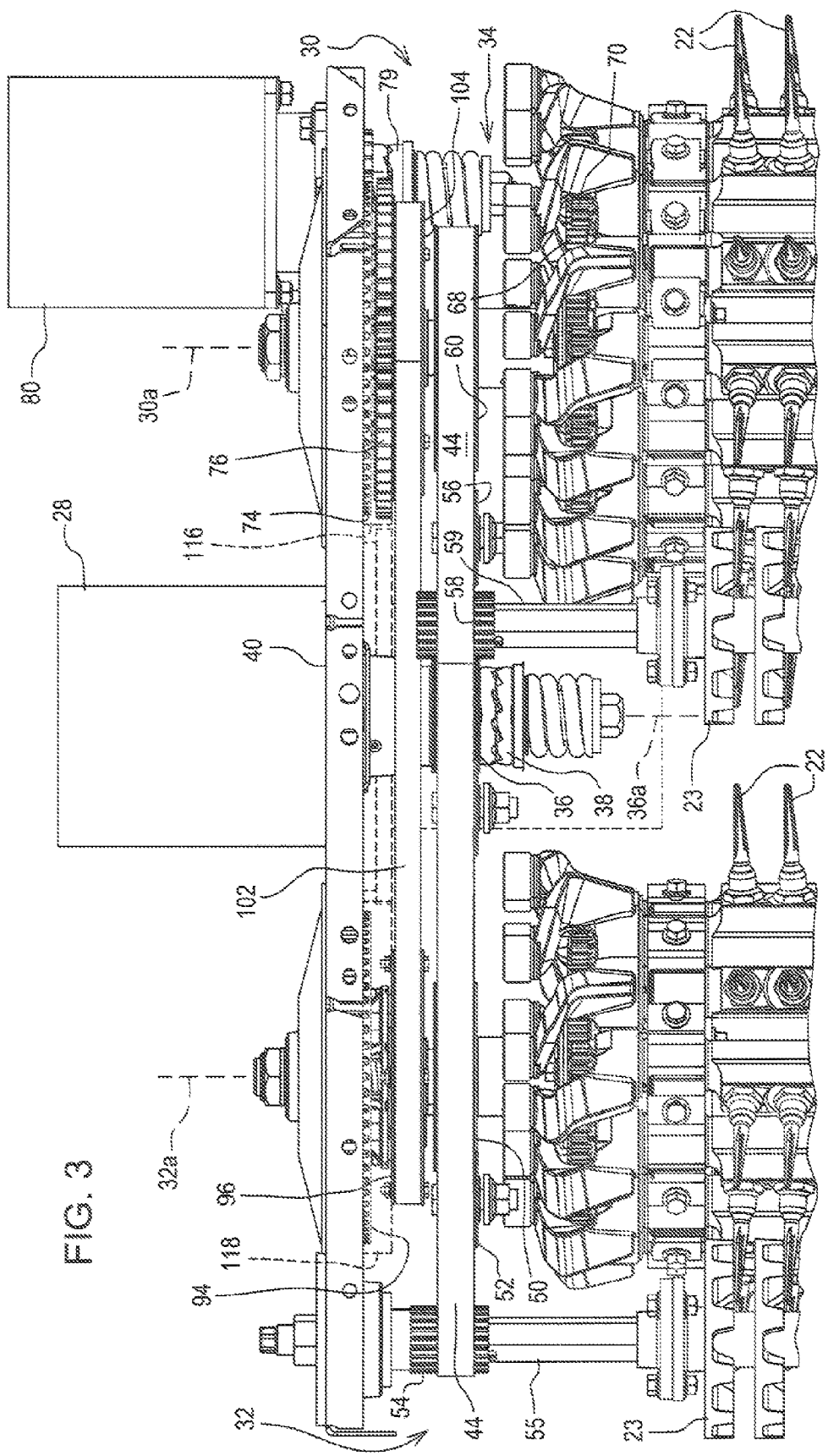
FIG. 3 is a side view of the belt drive structure of FIG. 2.

As shown in FIGS. 1-3, an upper compartment 34 houses drive components and bearings for the picking and doffing structure 18 including a main drive sheave 36 connected to a slip clutch 38 at the lower portion of the angle drive 28 below a top panel 40 for rotation about an upright axis 36a. A main drive belt 44 is trained around the drive sheave 36, an idler 46, a rear drum drive pulley 50 rotatable about the axis 32a, a rear idler 52, a rear doffer drive pulley 54 on a rear doffer shaft 55, a front idler 56, a front doffer drive pulley 58 on a front doffer shaft 59, and a front drum drive pulley 60 rotatable about the axis 30a. A planetary 64 or other variable speed transmission structure is driven from the pulley 60 via main drive sheave 36 and the belt 44.

A conventional spindle drive sun gear 68 is connected for rotation with the front drum pulley 60 and meshes with spindle drive gears 70 to rotate the spindles 22 about their axes at a speed dependent on the rotational speed of the drive shaft 26. As the pulley 60 is driven by the belt 44 from the main drive sheave 36, the spindle drive gears 70 are rotated by the sun gear 68. The drum assembly 30 includes a drum drive shaft 72 driven for rotation about the upright axis 30a via planetary carrier 74 by the pulley 60. A ring gear 76 meshes with planetary gears on the carrier 74 and may be driven in either rotational direction or locked to selectively vary the drum speed of rotation relative to the speed of rotation of the pulley 60.

As shown in FIGS. 1-3, the ring gear 76 meshes with an idler gear 78 which, in turn, is driven or locked against rotation via slip clutch drive 79 by a selectively variable speed motor 80 which may be hydraulic or electric and which may be infinitely variable. Therefore, the ratio of the spindle rotational speed to the drum rotational speed may be adjusted over a wide range of values by varying the speed and direction of rotation of the motor 80. The ratio may be adjusted by a controller 82 connected to the motor 80 to vary motor speed in either direction of rotation. The controller 82 is responsive to harvester ground speed and adjusts drum to spindle speed ratio and controls the drive to the main drive shaft 26 via controller output 84 to maintain synchronization of the drum speed to harvester speed. When the harvester is slowed and drum speed must slow to maintain synchronization of the drum with the plants entering the row receiving area 16, the controller will adjust the output 84 and the speed of the motor 80 to provide the necessary main drive shaft 26 speed and drum speed while maintaining the spindle rotational speed at or near the speed for optimum picking efficiency. At higher row unit speeds, the controller 82 may adjust the drum to spindle speed ratio by varying the speed of the motor 80 and main drive shaft 26 to prevent driving of the spindles above maximum desired rpm. If a lower cost row unit is desired, the ring gear 76 may be locked against rotation, and the planetary drive may be operated as conventional drive without speed ratio adjustment.

As show in FIGS. 2 and 3, the main drive sheave 36 and belt 44 also drive the front doffer drive pulley 58 and the doffer shaft 59 so that doffer rotational speed may be synchronized to spindle rotational speed for efficient doffing and for prevention of doffer over-speeding. The doffer rotational speed may also be controlled to maintain doffer speed below critical, even when the row unit is operated at high speeds, by varying the ratio.

The belt 44 may also power the rear drive pulley 50 for the rear drum assembly 32 to rotate the spindles 22 on the rear drum about their axes at speeds generally identical to the rotational speeds of the front drum spindles 22. The belt 44 may also power the rear doffer drive pulley 54 and the corresponding doffer shaft 55 to rotate the rear doffers 23 at speeds proportional to the spindle speeds and to maintain the spindle and doffer speeds at or below maximum speeds. The rear drum assembly also 32 includes drum drive shaft 92 driven for rotation about the upright axis 32a via planetary 94 by the pulley 50 from the drive sheave 36. A planetary pulley 96 is driven in unison with the front drum ring gear 76 by a belt 102 trained around the pulley 96, around a front drive pulley 104 and around idlers 106 and 108. The planetary gears on the carrier 96 are driven generally in unison with the planetary gears on the front planetary carrier 74 to vary the drum speed of rotation relative to the speed of rotation of the pulley 96. Alternatively, the pulley 96 may be connected for direct rotation with the rear drum drive shaft 92, and the front drive pulley 104 may be tied directly to the front drum drive shaft 72 so that the belt 102 acts as a drum drive belt to power the rear drum from the front drum. With the direct belt drive arrangement, the planetary or transmission structure between the pulley 96 and the rear drum drive shaft 92 may be eliminated. A single gearbox may be encased within a housing indicated generally by the dotted lines at 116 to further reduce noise and grease consumption.

The belts 44 and 102 may be cord reinforced rubber timing belts which positively engage toothed drive and driven pulleys. The planetary 64 and the planetary 92, if used, may be encased within the housing indicated at 116 and within a housing indicated by dotted lines at 118, respectively, to reduce grease contamination and consumption and further reduce row unit noise.

Having described the preferred embodiment, it will become apparent that various modifications can be made without departing from the scope of the invention as defined in the accompanying claims.

The invention claimed is:

1. A cotton harvester row unit drive for a row unit having spindle drum structure with rotatable spindles and rotatable doffing structure supported in a row unit housing for movement at a variable forward speed over a field of cotton, the drive comprising:
    a drum drive located in the row unit housing and rotating the drum structure about a drum axis at a speed generally proportional to the forward speed;
    a spindle drive;
    variable ratio transmission structure connecting the drum drive to the spindle drive;
    a controller connected to the transmission structure for varying the ratio of drum structure rotational speed relative to spindle rotational speed; and
    wherein at least one of the drum drive and the spindle drive includes a continuous flexible drive belt.

2. The row unit drive as set forth in claim 1 wherein the variable ratio transmission structure comprises a planetary gear having a ring gear rotatable about the drum axis.

3. The row unit drive as set forth in claim 2 including a variable speed motor connected to the controller and selectively driving the ring gear to vary the ratio.

4. The row unit drive as set forth in claim 1 wherein the continuous flexible drive belt drives the spindle drive, and further comprising a doffer drive with a doffer sheave, the continuous flexible drive belt trained around doffer sheave for rotating the doffing structure at a speed proportional to the spindle rotational speed.

5. The row unit drive as set forth in claim 4 wherein the drum structure includes first and second rotatable drums and the drum drive includes a drum belt connected between the first and second rotatable drums.

6. A cotton harvester row unit drive for a row unit having spindle drum structure with rotatable spindles and rotatable doffing structure supported in a row unit housing for movement at a variable forward speed over a field of cotton, the spindle drums including first and second spindle drums with drum rotational axes offset in a fore-and-aft direction from each other on one side only of a row receiving area, the spindle drums including spindles rotatable about generally horizontal axes, the doffing structure including first and second doffers adjacent the first and second spindle drums for rotation about upright doffer axes, the row unit drive comprising:

a variable ratio transmission having a drive output;
   drive belt structure located in the row unit housing and drivingly connecting the drive output to at least one of the first and second spindle drums;
   a spindle drive connected to the belt drive structure and to the variable ratio transmission; and
   transmission control structure connected to the variable ratio transmission to selectively vary ratio of speed of the spindle drive relative to rotational speed of the spindle drums.

7. The row unit drive as set forth in claim 6 wherein the variable ratio transmission comprises a planetary gear having a ring gear rotatable about one of the drum axes.

8. The row unit drive as set forth in claim 7 wherein the transmission control structure includes a variable speed motor connected to a controller and selectively driving the ring gear at variable speeds to vary the ratio.

9. The row unit drive as set forth in claim 8 wherein the drive belt structure is drivingly connected to at least one of the first and second doffers for operation of said at least one of the doffers at a speed proportional to the speed of the spindles.

10. The row unit drive as set forth in claim 6 wherein the drive belt structure includes a doffer drive belt drivingly connecting the spindle drive to at least one of the doffers.

11. The row unit drive as set forth in claim 10 wherein the doffer drive belt is drivingly connected to the first and second doffers for rotation of the doffers at a speed proportional to the output speed of the spindle drive output.

12. The row unit drive as set forth in claim 6 wherein the drive belt structure includes at least one endless belt drivingly connecting the drive output to the spindles on the first and second spindle drums and to the first and second doffers.

13. The row unit drive as set forth in claim 12 wherein the drive belt structure includes a drum belt connecting the first and second drums for rotation generally in unison with each other.

14. The row unit drive as set forth in claim 13 wherein the drive belt structure includes a main drive belt trained around first and second doffer drive sheaves for rotating the doffers at a speed proportional to rotational speed of the spindles.

15. The row unit drive as set forth in claim 14 wherein the main drive belt is trained around a drive pulley located between the drum rotational axes and driven by row unit drive structure.

16. The row unit drive as set forth in claim 14 wherein the main drive belt is trained around front and rear pulleys rotatable about the drum rotational axes and wherein the variable ratio transmission comprises a planetary connected to one of the first and second spindle drums and driven by one of the front and rear pulleys.

17. A method of operating cotton harvester row unit drive for a row unit having spindle drum structure with rotatable spindles and rotatable doffing structure supported in a row unit housing for movement at a variable forward speed over a field of cotton, the method of operating comprising:

driving the drum structure at a variable speed dependent on the forward speed of the row unit;
   driving a doffer drive shaft, the step of driving the doffer drive shaft including supporting a belt drive from the row unit housing and driving the doffer drive shaft and the spindles from the belt drive; and
   wherein the step of driving the drum structure includes varying the ratio of the belt drive speed to the drum structure speed.

18. The method as set forth in claim 17 wherein the step of varying the ratio includes providing a planetary gear with a ring gear connected to the spindle drum structure and driving the ring gear at variable speeds.

19. The method as set forth in claim 17 wherein the step of driving the drum structure includes rotating a belt drive sheave about the drum axis.

20. The method as set forth in claim 17 wherein the step of driving the drum structure includes the step of connecting a first belt drive sheave on a forward spindle drum to a second belt drive sheave on a rearward spindle drum with a flexible belt.

* * * * *